United States Patent [19]

Lee

[11] Patent Number: 5,461,540
[45] Date of Patent: Oct. 24, 1995

[54] HEAT DISSIPATION DEVICE FOR PERSONAL COMPUTERS

[75] Inventor: Michael Lee, Taipei, Taiwan

[73] Assignee: Infinity Group Corporation, San Pedro, Calif.

[21] Appl. No.: 213,257

[22] Filed: Mar. 15, 1994

[51] Int. Cl.⁶ .................................................. H05K 7/20
[52] U.S. Cl. .......................... 361/687; 165/185; 361/707
[58] Field of Search .................................. 165/80.3, 185; 174/16.3; 257/707, 708, 713, 719, 730; 361/687, 690, 704, 707, 709–711; 364/708.1

[56] References Cited

U.S. PATENT DOCUMENTS

| | | | |
|---|---|---|---|
| 4,177,499 | 12/1979 | Volkmann | 361/388 |
| 4,249,228 | 2/1981 | Moore | 361/388 |
| 4,342,068 | 7/1982 | Kling | 361/386 |
| 4,669,028 | 5/1987 | Faa, Jr. | 361/717 |
| 5,272,593 | 12/1993 | Jakob | 361/707 |

Primary Examiner—Gerald P. Tolin
Attorney, Agent, or Firm—Helfgott & Karas

[57] ABSTRACT

A heat dissipation device for personal computers wherein an aluminum made computer panel is used and having an extension formed and extending into the computer enclosure and completely superimposing the surface of the CPU in order to transfer heat generated by the CPU during operation by means of heat conduction from the CPU to the outside of the computer enclosure.

3 Claims, 1 Drawing Sheet

HEAT DISSIPATION DEVICE FOR PERSONAL COMPUTERS

BACKGROUND OF THE INVENTION

The present invention relates to a heat dissipation device for personal computers, and more particularly to a special heat dissipation device for personal computers wherein an aluminum made computer panel is used and having an extension formed and extending into the computer enclosure and completely superimposing the surface of the CPU during operation by means of heat conduction from the CPU to the outside of the computer enclosure.

As known by those skilled in the art, the CPU used in the personal computers, e.g. 80486 SX/DX/DX2, would generate heat resulting in a relatively high temperature rise (e.g. 90° C.) when it runs for a short period. Such a high temperature rise would result in the computer down. In order to solve this problem, a number of secondary cooling fans have been developed. One of which is an add-in card type cooling fan which is installed in the interface card for dissipation of heat generated by the CPU in the computer enclosure. With such an add-in card type cooling fan, the air circulates all inside the computer enclosure, and hence creates an even heat all over the computer enclosure. This will heat up other components provided within the computer enclosure because such an even heat can not be effectively transferred to the outside of the computer enclosure. Alternatively, an aluminum rectangular heat dissipation plate is arranged onto the CPU in the computer enclosure. However, the heat dissipated by such a heat dissipation plate will still stay within the computer enclosure and also can not be transferred to the outside of the computer enclosure.

SUMMARY OF THE INVENTION:

It is an object of the present invention aims at eliminating the above disadvantages and provide a heat dissipation device for personal computers wherein a computer panel is used as a direct heat dissipator for effectively transferring heat from the CPU to the outside of the computer enclosure.

In a preferred aspect of the present invention, the heat dissipation device for personal computers comprises an aluminum made computer panel having an extension formed and extending into the computer enclosure and completely superimporing CPU in order to transfer the heat generated by the CPU from the latter to the outside of the computer enclosure by means of heat conduction.

BRIEF DESCRIPTION OF THE DRAWING

An embodiment of the present invention will now be described by way of example with reference to the accompanying drawing in which.

Figure 1:
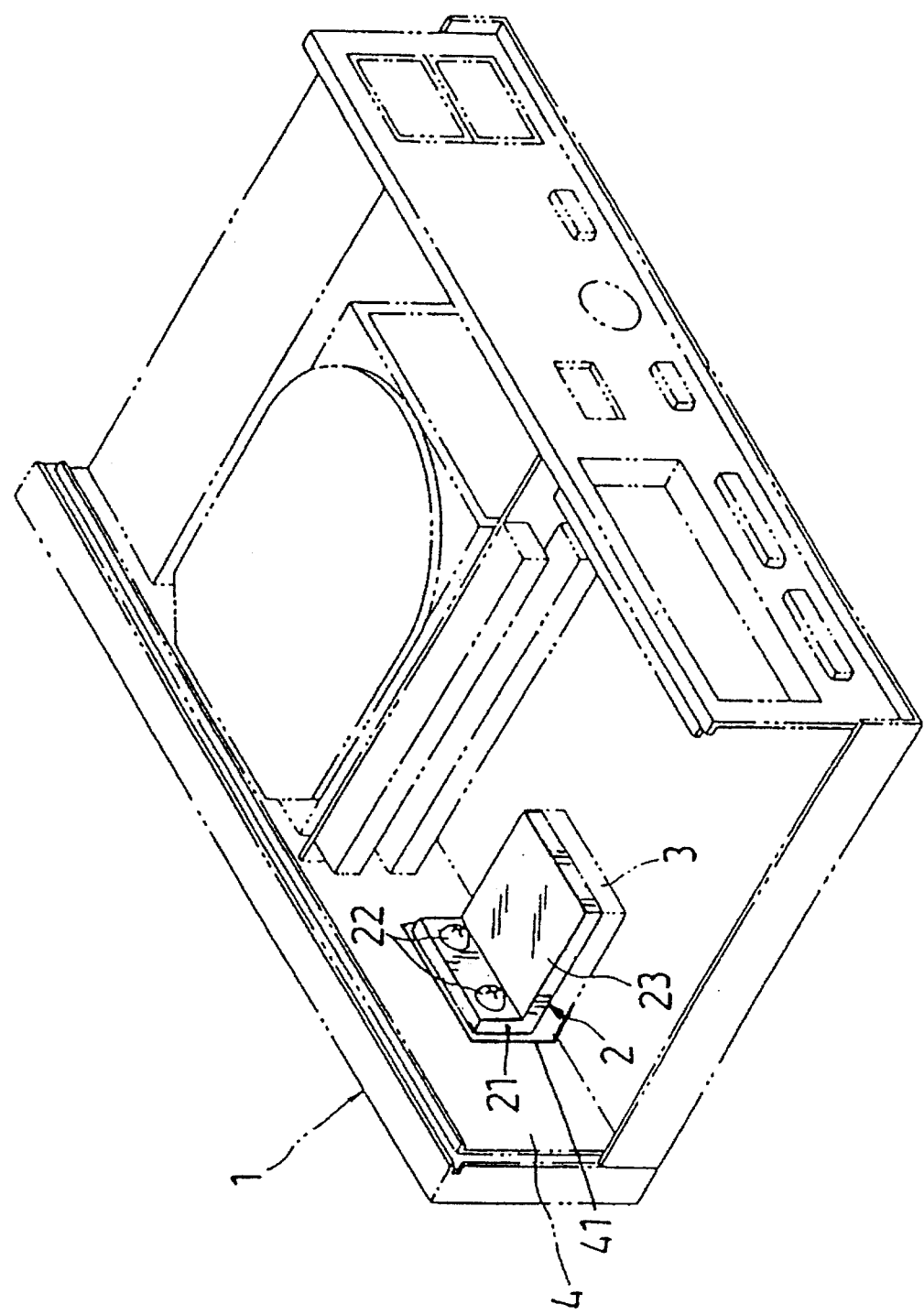
FIG. 1 is a back perspective view of an embodiment of a heat dissipation device for personal computers in accordance with the present invention with the top cover of the enclosure removed so as to show that the heat dissipation device contacts the CPU directly.

DETAILED DESCRIPTION OF THE INVENTION:

Referring to FIG. 1, a heat dissipation device for personal computers which is an embodiment of the present invention comprises an aluminum made computer panel 1 for personal computers and an aluminum made extension heat dissipation plate 2 etc. The computer panel 1 is formed in a desired size in accordance with the manufacturing specifications for various computers. The computer panel 1 and the extension heat dissipation plate 2 are made of aluminum material, and hence they can be formed integrally or separately. If they are formed integrally, an extension of rectangular plate (not shown) is extended backward from the computer panel into the computer enclosure 4 and completely superimposing and contacting the CPU 3. If they are formed separately, an extension heat dissipation plate 2 is formed in a L shape, and having a vertical plate portion 21 provided with a pair of holes 22 for fixation of the extension heat dissipation plate 2 onto the computer panel 1 at a suitable place by means of a pair of aluminum screws (not shown), and a horizontal plate portion 23 superimposing the CPU 3. Due to the fact that the computer panel 1 is disposed outside computer enclosure 4, the heat generated by the CPU can be transferred from the CPU to the outside of the computer enclosure through the aluminum made computer panel 1 by means of heat conduction. In other words, the present invention uses an aluminum computer panel as a direct heat dissipator to attain the object of efficiently transferring heat generated by the CPU to the outside of the computer enclosure. The computer enclosure 4 is provided with a through hole 41 at a suitable place to allow the extension heat dissipation plate 2 to extend into the inside of the enclosure and contact the CPU.

A comparative test on the heat dissipation effects obtained by the present heat dissipation device and the prior art aluminum rectangular heat dissipation plate has been made, and its result is shown in the following table:

|  | The present heat dissipation device | The prior art aluminum rectangular heat dissipation plate |
| --- | --- | --- |
| CPU to be tested | INTEL 80486D × 2–66 MHz | INTEL 80486D × 2–66 MHz |
| Room temperature | 22° C. | 22° C. |
| Temperture in the inside of the computer enclosure (lasted 72 hr) | 33–34° C. | 40–41° C. |
| Temperature of CPU (lasted 72 hr) | 39–39.6° C. | 65–66° C. |
| Temperature of aluminum computer panal (lasted 72 hr) | 30–31° C. | ABS made computer panel can not dissipate heat |

It can be seen from the above test result that the temperature of the CPU used in the present heat dissipation device is measured between 39° C.–39.6° C. after the CPU runs for 72 hr, while the temperature of the CPU used in the prior art aluminum rectangular heat dissipation plate is measured between 65° C.–66° C. after the CPU runs for 72 hr. Therefore, the present invention is superior to the prior art aluminum rectangular heat dissipation plate and would not result in the computer shut down due to overheat.

It should be noted that although the construction of the present invention is very simple, the idea of using the computer panel as a direct heat dissipator to transfer heat generated by the CPU in the computer enclosure to the outside of the computer enclosure in order to obtain a significant heat dissipation effect is non-obvious because till now, in the prior art, the heat dissipation is carried out within the computer enclosure.

I claim:

1. A heat dissipation device for personal computers, comprising in combination an aluminum made computer panel, a computer enclosure, said computer panel being mounted to the outside of said computer enclosure, and an aluminum made extension heat dissipation plate, said computer enclosure having a through hole, said heat dissipation plate extending through said through hole from said computer panel into said computer enclosure and completely superimposing and contacting a CPU in said computer enclosure, whereby heat generated by said CPU is transferred from said CPU to the outside of said computer enclosure and through said aluminum made computer panel by means of heat conduction.

2. The heat dissipation device as claimed in claim 1, wherein said aluminum made computer panel and said aluminum made extension heat dissipation plate are separately formed, and said aluminum made extension heat dissipation plate has a cross-section of L-shape and is fixed onto said aluminum made computer panel by means of screws.

3. The heat dissipation device as claimed in claim 1, wherein said heat dissipation plate is made integrally with said computer panel.

* * * * *